(12) United States Patent
Hauser (10) Patent No.: US 11,741,213 B2
(45) Date of Patent: Aug. 29, 2023

(54) SYSTEMS FOR ENHANCED BILATERAL MACHINE SECURITY

(71) Applicant: BANK OF AMERICA CORPORATION, Charlotte, NC (US)

(72) Inventor: Eran Hauser, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 310 days.

(21) Appl. No.: 17/357,055

(22) Filed: Jun. 24, 2021

(65) Prior Publication Data

US 2022/0414204 A1    Dec. 29, 2022

(51) Int. Cl.
*G06F 21/45*    (2013.01)
*G06F 9/445*    (2018.01)
*H04L 67/306*    (2022.01)
*G06F 21/44*    (2013.01)

(52) U.S. Cl.
CPC .......... *G06F 21/45* (2013.01); *G06F 9/44526* (2013.01); *H04L 67/306* (2013.01)

(58) Field of Classification Search
CPC ............... G06F 21/45; G06F 9/44526; G06F 2221/2129; G06F 21/44; H04L 67/306
See application file for complete search history.

(56) References Cited

U.S. PATENT DOCUMENTS

| | | | |
|---|---|---|---|
| 7,774,824 B2 | 8/2010 | Ross | |
| 8,151,327 B2 * | 4/2012 | Eisen | G06Q 20/3825 726/22 |
| 8,904,181 B1 | 12/2014 | Felsher et al. | |
| 9,195,834 B1 * | 11/2015 | Jakobsson | H04L 63/1483 |
| 9,256,881 B2 | 2/2016 | Engels et al. | |
| 9,311,679 B2 | 4/2016 | Shih et al. | |
| 9,503,438 B2 | 11/2016 | Choyi et al. | |
| 9,578,025 B2 | 2/2017 | Pinski et al. | |
| 9,722,984 B2 | 8/2017 | Burch et al. | |
| 10,033,717 B2 | 7/2018 | Wang et al. | |
| 10,154,052 B1 * | 12/2018 | McClintock | H04L 67/141 |
| 10,218,506 B1 | 2/2019 | Bhabbur et al. | |
| 10,521,623 B2 | 12/2019 | Rodriguez et al. | |
| 10,552,823 B1 * | 2/2020 | Woodward | G06Q 20/322 |
| 10,764,272 B1 * | 9/2020 | Manwiller | H04L 63/0876 |
| 10,970,716 B2 | 4/2021 | Martinez De Velasco Cortina et al. | |
| 11,347,879 B2 * | 5/2022 | Griffin | H04L 63/205 |
| 2004/0168083 A1 * | 8/2004 | Gasparini | H04L 67/02 713/176 |
| 2005/0198534 A1 * | 9/2005 | Matta | H04W 12/06 726/5 |
| 2005/0228782 A1 * | 10/2005 | Bronstein | H04L 63/126 |

(Continued)

*Primary Examiner* — Darren B Schwartz
(74) *Attorney, Agent, or Firm* — Moore & Van Allen PLLC; Nicholas C. Russell (57) ABSTRACT

Embodiments of the invention are directed to systems, methods, and computer program products for providing an enhanced form of machine security through the intelligent correlation of machine identity information with user account information and providing a unique process for automated display of such information to an end user. The system allows for the end user to quickly and visually identify that the user is interacting with a legitimate system or web-form, thereby reducing instances where the user may inadvertently share sensitive information with unauthorized parties.

15 Claims, 5 Drawing Sheets

(56) References Cited

U.S. PATENT DOCUMENTS

| | | | |
|---|---|---|---|
| 2005/0268107 A1* | 12/2005 | Harris | H04L 63/0853 |
| | | | 713/182 |
| 2006/0156385 A1* | 7/2006 | Chiviendacz | H04L 9/3271 |
| | | | 726/2 |
| 2007/0266257 A1* | 11/2007 | Camaisa | H04L 63/1483 |
| | | | 713/182 |
| 2008/0109657 A1* | 5/2008 | Bajaj | H04L 9/3213 |
| | | | 713/168 |
| 2009/0006861 A1* | 1/2009 | Bemmel | H04L 63/083 |
| | | | 713/189 |
| 2009/0077637 A1* | 3/2009 | Santos | H04L 63/126 |
| | | | 726/5 |
| 2009/0235346 A1* | 9/2009 | Steinberg | G06F 21/445 |
| | | | 726/8 |
| 2013/0014248 A1* | 1/2013 | McLaughlin | G06F 3/04883 |
| | | | 726/17 |
| 2013/0036458 A1* | 2/2013 | Liberman | G06F 21/32 |
| | | | 726/5 |
| 2014/0173711 A1* | 6/2014 | Zlatarev | H04L 63/0815 |
| | | | 726/8 |
| 2014/0189799 A1 | 7/2014 | Lu | |
| 2015/0012752 A1 | 1/2015 | Priyadarshi et al. | |
| 2015/0271177 A1* | 9/2015 | Mun | H04L 63/0853 |
| | | | 726/7 |
| 2015/0319156 A1 | 11/2015 | Guccione et al. | |
| 2016/0086176 A1 | 3/2016 | Silva Pinto et al. | |
| 2017/0346851 A1 | 11/2017 | Drake | |
| 2017/0352053 A1 | 12/2017 | Heeter | |
| 2018/0018838 A1 | 1/2018 | Fankhauser et al. | |
| 2018/0114597 A1 | 4/2018 | Grabiner et al. | |
| 2020/0244653 A1 | 7/2020 | Eichelberger et al. | |

* cited by examiner

SYSTEMS FOR ENHANCED BILATERAL MACHINE SECURITY

BACKGROUND

Attempts by malfeasant users to gain sensitive user authorization credentials in order to access network systems has become an increasingly relevant issue as of late, particularly in the context of enterprise computing. In certain instances, even with the implementation of stringent device management, authorization credentials may be unknowingly shared by human users who are fooled into thinking that they are interacting with a legitimate entity system or trusted third party. This human error can be costly, potentially giving malfeasant users widespread access to sensitive internal data. As such, it is increasingly important to implement innovative systems and methods of thwarting this type of malfeasant attempt.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention described herein address the above needs by implementing intelligent system and methods for providing verified and actionable data to end users which allows for the upmost scrutiny and increased assurance in sharing of sensitive authorization credentials. The invention may include using a programmable architecture for sharing machine identity data within an internal enterprise network for the purpose of bilateral verification of device and user. The invention is bilateral in the sense that the entity systems verify machine identity, and in response, display selective information to certain authorized machines or users in a dynamic fashion. This allows the user to quickly and accurately discern if an entity system is legitimate. In this way, entity systems may intelligently self-identify in a graphical manner to assure users that they are interacting with a verified login page, software, portal, service, or the like, in which case they may enter their secure authorization credentials with the peace of mind that they are not leaking such information to an illegitimate party emulating the entity systems.

The invention leverages the linkage between entity machine identity and user identity to supplement the entity's security systems with an additional safeguard referred to herein as "website authentication" Website authentication allows the user connected to the entity network via the entity machine to verify the authenticity of the website, service, software, or the like, that the user is attempting to log into. In conventional systems, websites typically authenticate users, but users are left with limited information that would be useful or necessary in fully verifying the identity of the website. For instance, the user may access an emulated, illegitimate website which is graphically similar to a website hosted by the legitimate entity system, save for a few minute details that may be hard to decipher quickly (e.g., an illegitimate website may contain certain subtle indications, if any, that the website is not authentic, such as a skewed page layout, low or altered resolution of entity brand images, inoperable or incorrect links, incorrect domain names or DNS information, or the like). These illegitimate websites may present users with a log-in page designed to appear legitimate, where the user enters sensitive information that is captured for unauthorized use. In ideal situations, all users of an entity system are diligent at all times, and inauthentic or illegitimate websites are unable to collect sensitive information. However, malfeasant actors may target entities with a large number of users, increasing the statistical chance that a single user may make a single error. Even a single user error in this instance can be costly, as an unauthorized user may be able to collect authorization credentials in order to access a wide array of entity systems in some cases. The introduction of website authentication would result in a more robust, bilateral authentication, by which both the website and the corporate user verify one another's authenticity in a quickly and clearly decipherable manner. The additional safeguard of the present invention reduces the entity's possibility of being the subject of data leaking, and as such, reduces the potential for information security breach. Implementation of this invention will therefore strengthen overall entity information security.

Embodiments of the invention relate to systems, methods, and computer program products for enhanced machine security, the system generally comprising the following steps: receive and store user account data for one or more users; receive and store entity machine identity data for one or more entity user devices; correlate the user account data with the entity machine identity data for each of the one or more entity user devices; receive a user login request from a specific user device; in response to the user login request, confirm that a machine identity of the specific user device matches the entity machine identity data for one of the one or more entity user devices; identify a portion of the user account data correlated with the one of the one or more entity user devices; and automatically display the portion of the user account data via a graphical user interface of the user device.

In some embodiments, the user account data for the one or more users comprises a username, name, email address, personal identification number, or one or more interests of the user.

In further embodiments, the machine identity further comprises a MAC address or other physical device identifier.

In still further embodiments, the one or more entity user devices are further assigned to the one or more users on a one-to-one basis.

In other embodiments, the invention further comprises using a web-browser plug-in to automate retrieval of the machine identity of the specific user device and refreshing a web page to automatically display the portion of the user account data.

In some embodiments, identifying the portion of the user account data further comprises randomly or pseudo-randomly selecting a non-sensitive data point from the user account correlated with the machine identity.

In some embodiments, the invention is further configured to combine one or more data points from the user account data to generate a unique display character string.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity. In some embodiments, an entity may be an organization, or the like in the business of moving, investing, or lending money, dealing in financial instruments, or providing financial services.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as an employee, administrator, or the like. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user in connection with the entity.

Figure 1:
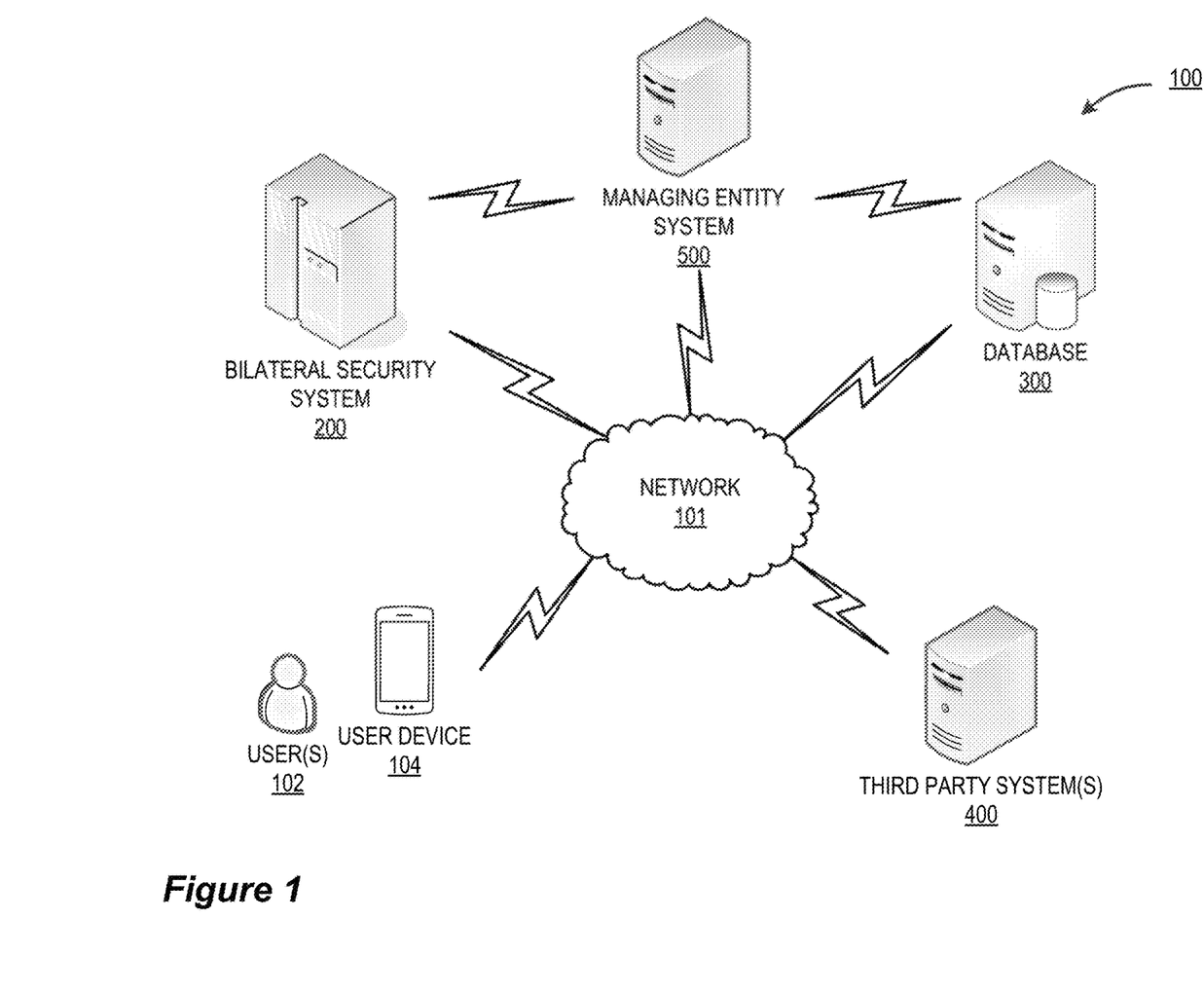
FIG. 1 illustrates an operating environment for the bilateral security system, in accordance with one embodiment of the present disclosure.

FIG. 1 illustrates an operating environment for the bilateral security system, in accordance with one embodiment of the present disclosure. As illustrated, the operating environment 100 may comprise a user 102 and/or a user device 104 in operative communication with one or more third party systems 400 (e.g., web site hosts, registry systems, financial entities, third party entity systems, or the like). The operative communication may occur via a network 101 as depicted, or the user 102 may be physically present at a location separate from the various systems described, utilizing the systems remotely. The operating environment also includes a managing entity system 500, bilateral security system 200, a database 300, and/or other systems/devices not illustrated herein and connected via a network 101. As such, the user 102 may request information from or utilize the services of the bilateral security system 200, or the third party system 400 by establishing operative communication channels between the user device 104, the managing entity system 500, and the third party system 400 via a network 101.

Typically, the bilateral security system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. In some embodiments, the user device 104 may operatively connect to the managing entity system 500 via a virtual private network (VPN), or the like. In some embodiments, the user device 104 may be used as a host device for a virtual computing environment, wherein the operating system and computing session is hosted by a remote device, such as managing entity system 500, and displayed via the hardware of the user device 104. In some embodiments, the user device 104 may be managed by the managing entity system 500, such as via a mobile device management (MDM) platform, or the like, wherein certain operations, device data, device capabilities, or the like, are monitored, restricted, or further secured in some way. In other embodiments, the user device 104 may be provided specialized access to the network 101, or a VPN secured by the managing entity system 500 or third party systems 400, such that only a limited number of pre-authorized devices or virtual computing environments related to particular authorized users of the users 102 are able to access the entity's network platform. In some embodiments, the user devices 104 may be issued to users 102 by the entity. In any embodiment, identifying data of the user device 104 may be collected and stored in the database 300, and may be used to discern if one or more devices should have access to the network 101 or an internal LAN, VPN, or the like, of the entity.

The user device 104 may comprise a mobile communication device, such as a cellular telecommunications device (e.g., a smart phone or mobile phone, or the like), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The bilateral security system 200 may comprise a communication module and memory not illustrated, and may be configured to establish operative communication channels with a third party system 400, managing entity system 500, and/or a user device 104 via a network 101. The bilateral security system 200 may comprise a data repository or system datastore 255. The system datastore 255 may contain resource account data, and may also contain user data. This user data may be used by the managing entity to authorize or validate the identity of the user 102, the identifying characteristics of the user device 104, or the like, for accessing the system (e.g., via a username, password, biometric security mechanism, two-factor authentication mechanism, or the like). In some embodiments, the managing entity system is in operative communication with the bilateral security system 200 and database 300 via a private communication channel. The private communication channel may be via a network 101 or the bilateral security system 200 and database 300 may be fully integrated within the managing entity system 500, such as a virtual private network (VPN), or over a secure socket layer (SSL). The managing entity system 500 may communicate with the bilateral security system 200 in order to transmit data associated with observed resource transaction or account data by or via a plurality of third party systems 400. In some embodiments, the managing entity may utilize the features and functions of the bilateral security system 200.

Figure 2:
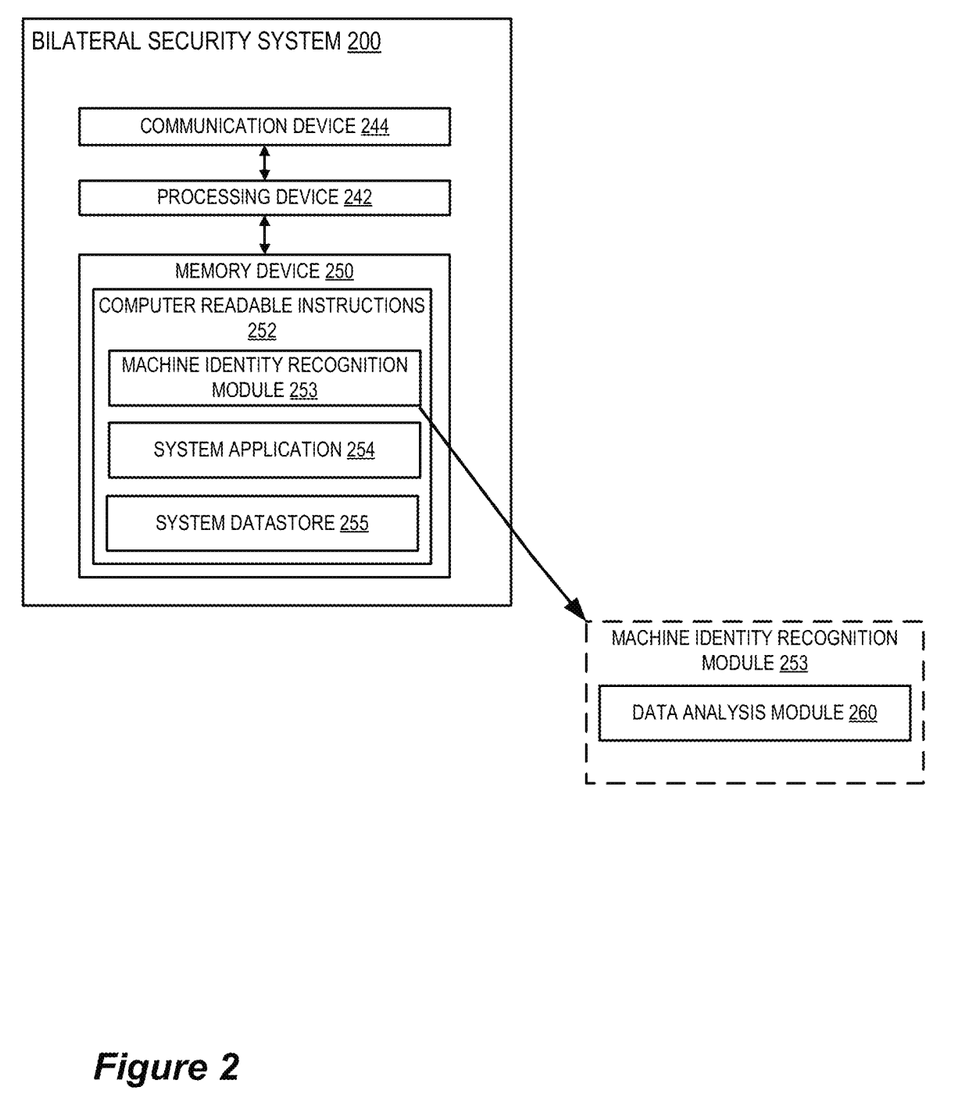
FIG. 2 is a block diagram illustrating components of the bilateral security system, in accordance with one embodiment of the present disclosure.

FIG. 2 illustrates a block diagram of the bilateral security system 200 associated with the operating environment 100, in accordance with embodiments of the present invention. As illustrated in FIG. 2, the bilateral security system 200 may include a communication device 244, a processing device 242, and a memory device 250 having a machine identity recognition module 253, a system application 254 and a system datastore 255 stored therein. As shown, the processing device 242 is operatively connected to and is configured to control and cause the communication device 244, and the memory device 250 to perform one or more functions. In some embodiments, the machine identity recognition module 253 and/or the system application 254 comprises computer readable instructions that when executed by the processing device 242 cause the processing device 242 to perform one or more functions and/or transmit control instructions to the database 300, the managing entity system 500, or the communication device 244. It will be understood that the machine identity recognition module 253 or the system application 254 may be executable to initiate, perform, complete, and/or facilitate one or more portions of any embodiments described and/or contemplated herein. The machine identity recognition module 253 may comprise executable instructions associated with data processing and analysis and may be embodied within the system application 254 in some instances. The bilateral security system 200 may be owned by, operated by and/or affiliated with the same managing entity that owns or operates the managing entity system 500. In some embodiments, the bilateral security system 200 is fully integrated within the managing entity system 500, meaning that there are not separate physical devices, sets of devices, or the like which perform the operations of the bilateral security system 200, but rather dedicated resources of the overall managing entity system 500 which are tasked for or used to operate the functions of the bilateral security system 200.

The machine identity recognition module 253 may further comprise a data analysis module 260. The data analysis module 260 may store instructions and/or data that may cause or enable the bilateral security system 200 to receive, store, and/or analyze data received by the managing entity system 500 or the database 300, as well as generate information and transmit responsive data to the managing entity system 500 in response to one or more requests or via a data stream between the bilateral security system 200 and the managing entity system 500. The data analysis module 260 may process data in order to identify correlations or matches between machine identity information and user account information. For instance, in some embodiments, the data analysis module 260 may receive one or more requests from the managing entity system 500 which contain data indicating one or more specific user devices 104 have requested a secure web page hosted by the managing entity system, or the like (e.g., an intranet web page, a secure web portal, or the like). The data analysis module 260 may leverage a data correlation between a machine's identifying information and a user identity, or user account identity, in order to provide the managing entity system 500 with authentication information in response. The authentication information may be predetermined by the user 102 or the managing entity system 500 in some instances. In other instances, the information may be unique generated by the bilateral security system 200 by combining, splicing, or the like, random information into segments of meaningful information (e.g., user information such as a PIN code, birth date, security question, or other meaningful information may be interlaced with random characters in such a way where the meaningful information is still legible or noticeable to the user, but is not readily apparent to an unknowledgeable user posing as a legitimate user). This information would allow the user 102 to view the responsive information and determine quickly that the website, portal, or other page is legitimate, as it is able to correlate their machine identity with their unique user information, which in some cases may not be generally available to third party systems 400.

The communication device 244 may generally include a modem, server, transceiver, and/or other devices for communicating with other devices on the network 101. The communication device 244 may be a communication interface having one or more communication devices configured to communicate with one or more other devices on the network 101, such as the bilateral security system 200, the user device 104, other processing systems, data systems, etc.

Additionally, referring to bilateral security system 200 illustrated in FIG. 2, the processing device 242 may generally refer to a device or combination of devices having circuitry used for implementing the communication and/or logic functions of the bilateral security system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the bilateral security system 200 may be allocated between these processing devices according to their respective capabilities. The processing device 242 may further include functionality to operate one or more software programs based on computer-executable program code 252 thereof, which may be stored in a memory device 250, such as the system application 254 and the machine identity recognition module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the bilateral security system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein. The memory device may include a data repository 256 which provides storage for relevant user-machine identity correlation data and responsive output data. The bilateral security system 200 may be programmed or interacted with by users of the managing entity system 500 via the system application, which may allow the users to program the bilateral security system 200 features, designate certain secure websites or portals which may leverage the capabilities of the bilateral security system 200, or the like.

Figure 3:
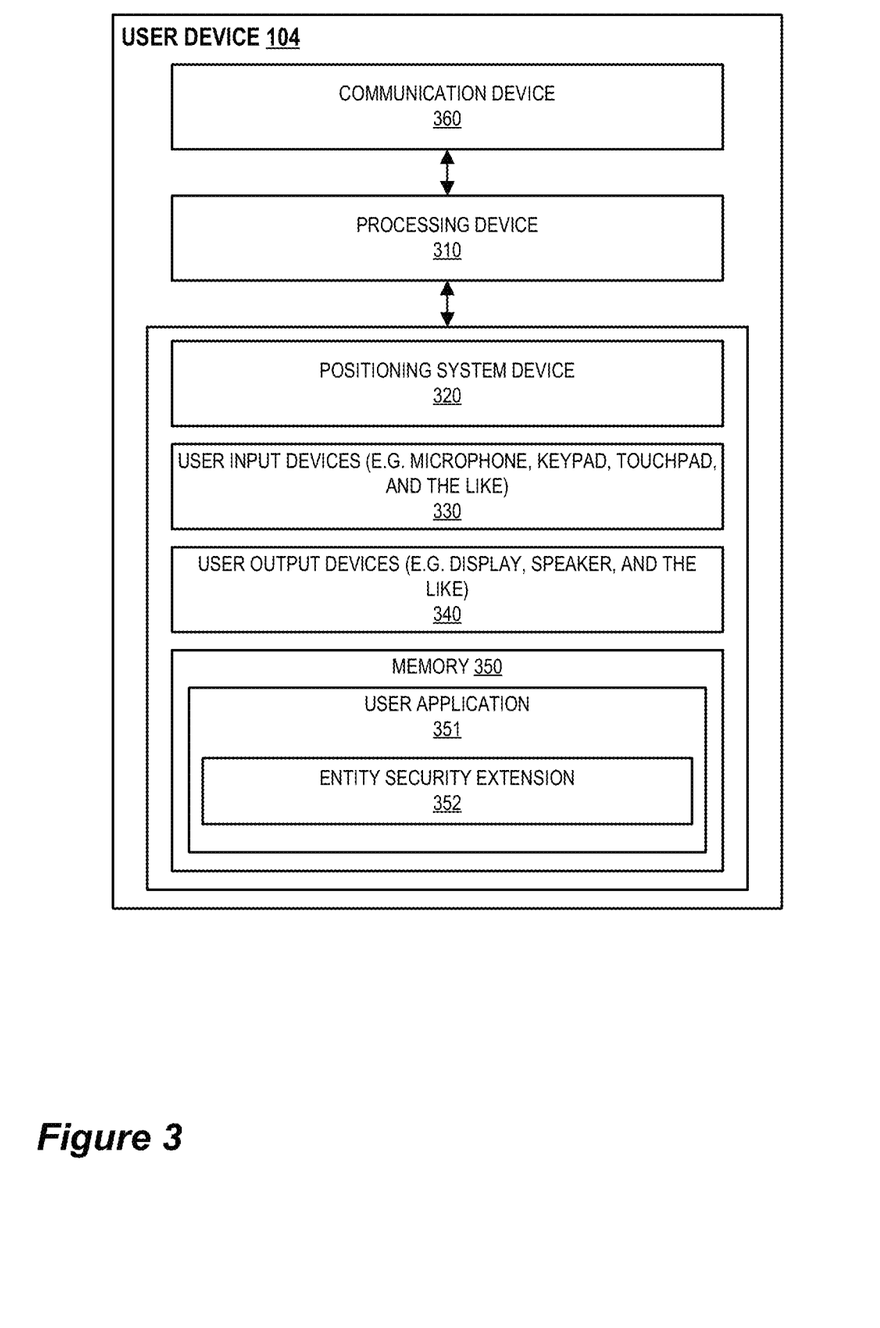
FIG. 3 is a block diagram illustrating a user device, in accordance with one embodiment of the present disclosure.

FIG. 3 is a block diagram illustrating a user device associated with the bilateral security system, in accordance with one embodiment of the present disclosure. The user device 104 may include a user mobile device, a desktop computer, a thin-client, or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The user device 104 may generally include a processing device or processor 310 communicably coupled to devices such as, a memory device 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 350. For example, the processor 310 may be capable of operating applications such as a user application 351, such as a web browser, and one or more entity security extension(s) 352, which may interface with the user application 351 in order to automate the collection, transfer, and receipt of data between the user device 104 and the bilateral security system 200 or managing entity system 500. The user application 351 or the entity security extension 352 may allow the user device 104 to transmit and receive data and instructions to or from the third party system 400, bilateral security system 200, and the managing entity system 500, and display received information via the user interface of the user device 104. The entity security extension 352 may, in some embodiments, be a software component that adds features to an existing web browser or application on the user device, and may also be referred to as a "plug in," in some instances. The entity security extension 352 allows the managing entity system 500, acting as a third-party developer with respect to the web browser or other application on the user device 104, to create specific functions or expand functionality of the application, such as user application 351. This can be part of a stand-alone app or part of an internet browser. The user application 351 may further allow the user device 104 to transmit and receive data to or from the managing entity system 500 (for example, via wireless communication over the network 101), data and instructions to or from the bilateral security system 200, web content, such as, for example, location-based content and/or other web page content, according to a Wireless Application Protocol (WAP), Hypertext Transfer Protocol (HTTP), and/or the like. The user application 351 may allow the managing entity system 500 to present the user 102 with a plurality of data, authorization information, graphical data, and/or the like for the user to review, respond to, and interact with via the user input device(s) 330. In some embodiments, the user interface displayed via the user application 351 may be entity specific. For instance, while the bilateral security system 200 may be accessed by multiple different entities, it may be configured to present information according to the preferences or overall common themes or branding of each entity system of third party system. In this way, each system accessing the bilateral security system 200 may use unique aesthetic of user application 351, or entity security extension(s) 352, but all entities may access the same information, given that they are permitted by the managing entity system 500. For instance, the services or capabilities of the bilateral security system 200 may be provided as a service to one or more third parties interested in leveraging the capabilities of the system.

The processor 310 may be configured to use the communication device 360 to communicate with one or more devices on a network 101 such as, but not limited to the third party system 400, the bilateral security system 200, and the managing entity system 500. In this regard, the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker or other audio device, which are operatively coupled to the processor 310 and allow the user device to output generated audio received from the bilateral security system 200. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processor 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the bilateral security system 200 performing one or more steps described herein in conjunction with other devices and systems, either automatically based on executing computer readable instructions of the memory device 250, or in response to receiving control instructions from the managing entity system 500. In some instances, the system refers to the devices and systems of the operating environment 100 of FIG. 1, or the bilateral security system 200 specifically, of FIG. 2. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
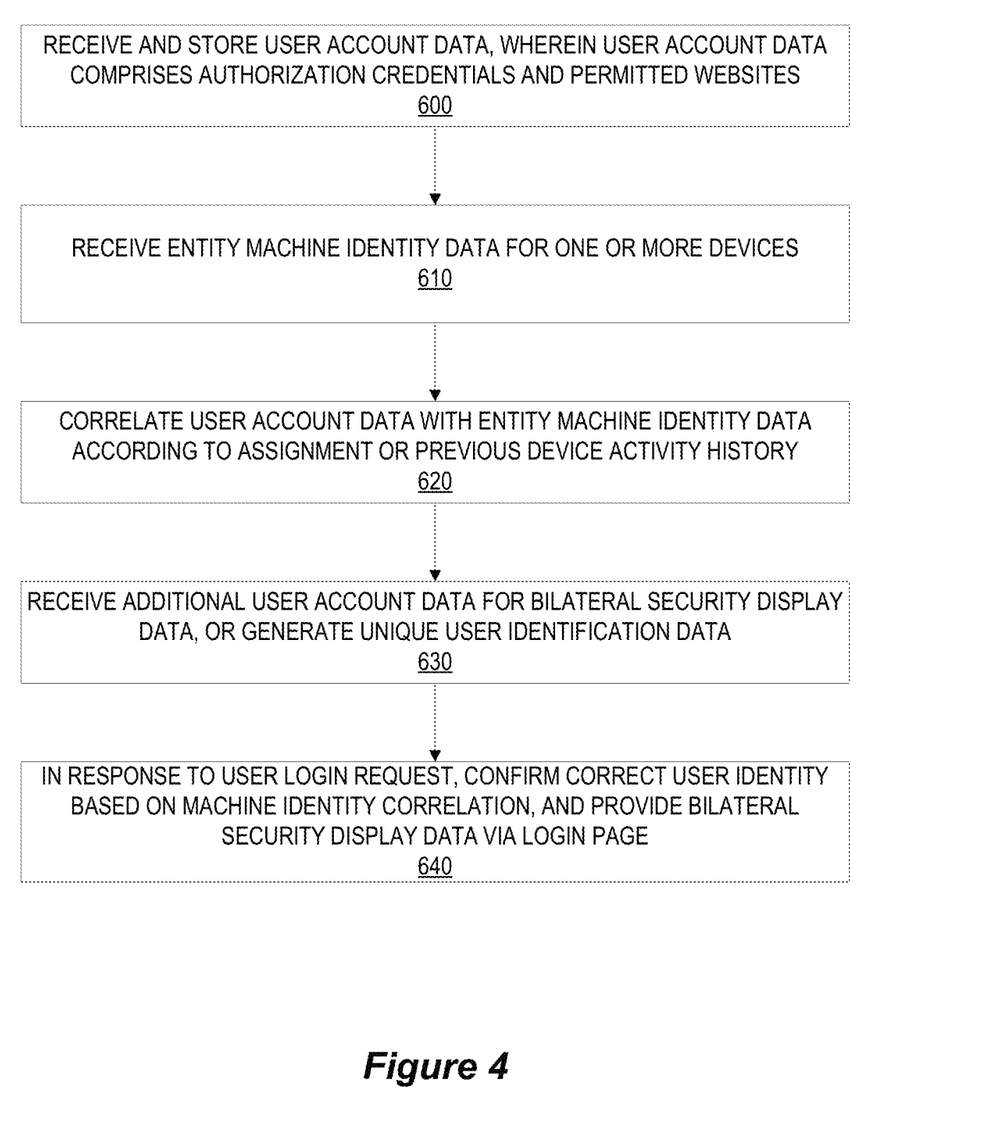
FIG. 4 is a flow diagram illustrating a process of gathering and correlating user device data and user identity data, in accordance with one embodiment of the present disclosure.

FIG. 4 is a flow diagram illustrating a process of gathering and correlating user device data and user identity data, in accordance with one embodiment of the present disclosure. As shown in block 600, the process begins whereby the bilateral security system 200 receives and stores user account data. The user account data may comprise a number of different data points related to or descriptive of a user, including authorization credentials (e.g., username, password, pin code, or the like, which may be required to access entity systems, the user's own account, entity services, or the like), name, employee role, level of security access (e.g., the entity may maintain a tiered level of access for different employees, or the like), interests, location, personal user device identifiers, address, email address, phone number, or the like. In addition, the bilateral security system 200 may store a list of permitted websites either as a part of the user account data, or in some embodiments, as an entity-wide rule or employee related and role-specific rule in order to enforce security of the system. For instance, users connected to the network 101, or an entity-specific network, such as an internal network, may be required to follow an entity policy that requires users to restrict sharing of their authorization credentials with outside parties. Users may be permitted to only use their authorization credentials with certain secure, entity-hosted websites, or the like, as a matter of best practice to avoid unauthorized access to the entity systems, as well as to avoid situations where the user may inadvertently expose sensitive data to third parties or malfeasant actors. In either case, the system may categorize groups of users or user accounts as permitted to share their respective authorization credentials with one or more specific websites, domains, entity services, or the like, and may refer to this data later on in the process of implementing the bilateral security system 200.

As shown in block 610, the process proceeds by receiving entity machine identity data for one or more devices. Entity machine identity data may include a media access control address (MAC address), hardware identifier, virtual machine identifier, static IP address, or the like, which is used by the managing entity system 500 in order to discern unique devices and how or when they connect to the entity network, connect to other devices on the network, or access managing entity system 500 services or file systems. Such data may be collected by the bilateral security system 200 or the managing entity system 500 at the time a virtual machine is created, or in instances of physical user devices, prior to a user device being issued to a user, by analyzing network traffic, or in some instance by querying each respective user device (e.g., via address resolution protocol, or the like).

As shown in block 620, the system may then correlate user account data with entity machine identity data according to either assignment or previous access or device activity history based on network traffic. In instances where the correlation is done based on assignment, the managing entity system 500 may assign each user to one or more user devices 104 which are owned by, or partially or fully managed by, the entity (e.g., via an MDM process, or the like). In some embodiments, the assignment of entity devices to users or employees of the entity may be done on a one-to-one basis, wherein each user or employee is designated a single machine for user in accessing entity systems. In other embodiments, the system may limit the use of each device to a single user, wherein the single user may have access to more than one device, but a single device may not be correlated with user account data of more than one unique user or employee, except in cases where the device is accessed by a system administrator or particular user with broader access rights. For instance, a specific user may be issued a specific user device to be used for their employment role with the entity in order to access entity systems and files, and the machine identity associated with the assigned specific user device may be correlated with the user account data of the specific user, wherein the bilateral security system 200 may recognize that the specific user should be the only one using the specific device in order to access the managing entity system 500, except for cases in which a system administrator may provide override authorization credentials, or the like.

In some embodiments, the user device may be a physical device, such as a phone, a laptop, or the like. In other embodiments, the user device may be a virtual machine. In some embodiments, the bilateral security system 200 may analyze device activity history in order to identity which devices were used by certain users to access entity systems, log the device identifiers for those specific devices, and correlate them with the user account data for that user. In this way, the bilateral security system 200 may adapt over time in order to learn which devices are trusted by the user (e.g., the bilateral security system 200 may require an extra authentication step if the user is logging in from an unrecognized device, such as a two-factor authentication, pre-shared key, or the like).

As shown in block 630, the system may also receive additional user account data for bilateral security display data, or in some instances may generate this unique data by combining other known data related to the user. For instance, the bilateral security system 200 may receive a user-programmed, or administrator programmed, pre-defined and user-specific alphanumeric phrase which the user will recognize as their bilateral security display data. In some instances, this may be an additional passcode, numeric string, such as a pin code, an otherwise arbitrary phrase, word, sentence, combination of numbers and words, or the like, which the user will recognize. In some instances, the bilateral security display data may be some other data already stored in the user account, such as the user's name. In other embodiments, the bilateral security system 200 may randomly combine non-sensitive data in the user account in order to generate dynamic bilateral security display data, such as by combining the user's first name and one or more randomly or pseudo-randomly selected interests that the user has provided to the bilateral security system 200 and are stored in the user account for the user.

Further, as shown in block 640, in response to a user login request, the bilateral security system 200 may recognize the machine identity of the user device utilized for the login request, confirm the correct user identity for that machine based on correlation of received machine identity data and user account data, and provide the bilateral security display data for the user via a login page, web portal, or other graphical user interface of the user device. By providing the bilateral security display data via the graphical user interface or login page, the user may immediately recognize that the website they are attempting to visit or log-in to is legitimate based on the fact that it was able to provide the bilateral security display data by virtue of its ability to correlate the machine identity of their user device with the correct user account. In some embodiments, this process may be automated using entity security extension 352, wherein the entity security extension 352 is a browser plug-in or add-on which automates the process of querying the unique device identifier of the user device, transmitting this information to the bilateral security system 200 directly, receiving the bilateral security display data, and automatically populating or refreshing the web page to include the bilateral security display data.

Figure 5:
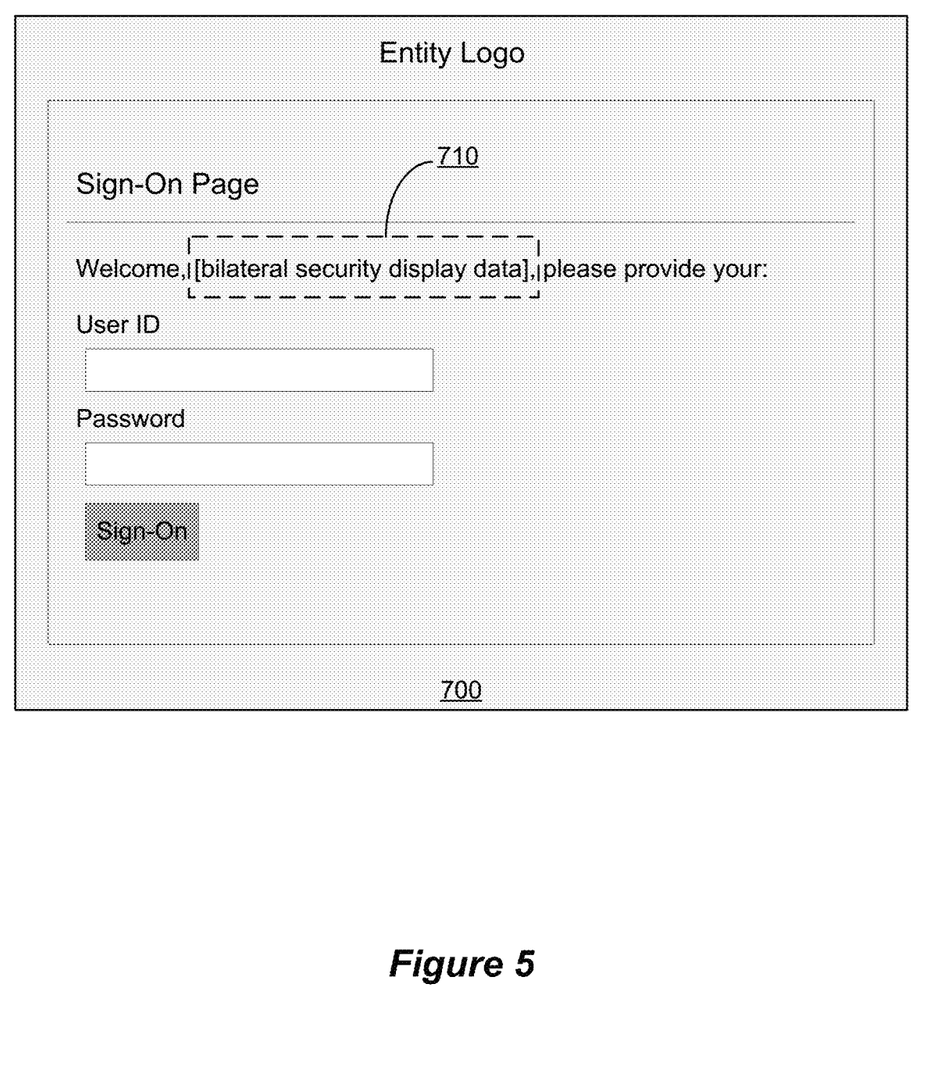
FIG. 5 is a flow diagram illustrating an example graphical display for bilateral security display data, in accordance with one embodiment of the present disclosure.

FIG. 5 is a flow diagram illustrating an example graphical display for bilateral security display data, in accordance with one embodiment of the present disclosure. As shown in the embodiment of FIG. 5, the page 700 may include various fields of information, such as a "Sign-On Page" of the managing entity system 500 (e.g., "Entity Logo" shown at the top of the Sign-On Page may be customized to the aesthetic of the entity utilizing the functions of the bilateral security system 200, or the like). Additionally, there may be fields for the user to input authorization credentials, authentication information, or the like, such as a "User ID," and a "Password." Prior to the user entering such authorization credentials, the system may perform the steps described above with respect to FIG. 4, and populate field 710 with the bilateral security display data. As such, the user may visually confirm the accuracy of the bilateral security display data (e.g., confirm that the bilateral security display data contains appropriate information related to their user account, identity, pre-assigned bilateral security display data, or the like), and may use this indication as an indication that the website is secure and legitimately owned, operated, or controlled by the managing entity system 500. In instances where the bilateral security display data is not recognized by the user, the user may correctly form a suspicion that they may have clicked a malicious link, or otherwise been directed to an illegitimate web-form which cannot correctly correlate their unique machine identity with their user account information. In such instances, the user may be instructed to notify an entity network administrator, IT personnel, or the like, in order to report the suspicion and receive further confirmation or direction on how to proceed, as opposed to blindly entering in their sensitive authorization credentials, potentially sharing such information with illegitimate parties.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for enhanced machine security, the system comprising:
   at least one non-transitory storage device; and
   at least one processing device coupled to the at least one non-transitory storage device, wherein the at least one processing device is configured to:
   receive and store user account data for one or more users;
   receive and store entity machine identity data for one or more entity user devices;
   correlate the user account data with the entity machine identity data for each of the one or more entity user devices;
   more entity user devices;
   receive a user login request from a specific user device;
   in response to the user login request, confirm that a machine identity of the specific user device matches the entity machine identity data for one of the one or more entity user devices, wherein confirming that the machine identity of the specific user device matches the entity machine identity data for one of the one or more entity user devices comprises using a web-browser plug-in to automate retrieval of the machine identity of the specific user device;
   identify a portion of the user account data correlated with the one of the one or more entity user devices by pseudo-randomly selecting a non-sensitive data point from a user account correlated with the machine identity;
   combine one or more data points, including the non-sensitive data point, from the user account data to generate a unique display character string; and
   automatically display the unique display character string via a graphical user interface of the specific user device by refreshing a web page to display the unique display character string.

2. The system of claim 1, the user account data for the one or more users comprises a username, name, email address, personal identification number, or one or more interests of the user.

3. The system of claim 1, wherein the machine identity further comprises a MAC address or other physical device identifier.

4. The system of claim 1, wherein the one or more entity user devices are further assigned to the one or more users on a one-to-one basis.

5. The system of claim 1, wherein identifying the portion of the user account data further comprises randomly or pseudo-randomly selecting a non-sensitive data point from a user account correlated with the machine identity.

6. A computer program product for enhanced machine security, the computer program product comprising at least one non-transitory computer-readable medium having computer-readable program code portions embodied therein, the computer-readable program code portions comprising:
   an executable portion configured to receive and store user account data for one or more users;
   an executable portion configured to receive and store entity machine identity data for one or more entity user devices;
   an executable portion configured to correlate the user account data with the entity machine identity data for each of the one or more entity user devices;
   an executable portion configured to receive a user login request from a specific user device;
   an executable portion configured to, in response to the user login request, confirm that a machine identity of the specific user device matches the entity machine identity data for one of the one or more entity user devices, wherein confirming that the machine identity of the specific user device matches the entity machine identity data for one of the one or more entity user devices comprises using a web-browser plug-in to automate retrieval of the machine identity of the specific user device;

an executable portion configured to identify a portion of the user account data correlated with the one of the one or more entity user devices by pseudo-randomly selecting a non-sensitive data point from a user account correlated with the machine identity;

combine one or more data points, including the non-sensitive data point, from the user account data to generate a unique display character string; and an executable portion configured to automatically display the unique display character string via a graphical user interface of the specific user device by refreshing a web page to display the unique display character string.

7. The computer program product of claim 6, wherein the user account data for the one or more users further comprises a username, name, email address, personal identification number, or one or more interests of the user.

8. The computer program product of claim 6, wherein the machine identity further comprises a MAC address or other physical device identifier.

9. The computer program product of claim 6, wherein the one or more entity user devices are further assigned to the one or more users on a one-to-one basis.

10. The computer program product of claim 6, wherein identifying the portion of the user account data further comprises randomly or pseudo-randomly selecting a non-sensitive data point from a user account correlated with the machine identity.

11. A computer-implemented method for enhanced machine security, the method comprising:
providing a computing system comprising a computer processing device and a non-transitory computer readable medium, wherein the computer readable medium comprises configured computer program instruction code, such that when said instruction code is operated by said computer processing device, said computer processing device performs the following operations:

receiving and storing user account data for one or more users;

receiving and storing entity machine identity data for one or more entity user devices;

correlating the user account data with the entity machine identity data for each of the one or more entity user devices;

receiving a user login request from a specific user device;

in response to the user login request, confirming that a machine identity of the specific user device matches the entity machine identity data for one of the one or more entity user devices, wherein confirming that the machine identity of the specific user device matches the entity machine identity data for one of the one or more entity user devices comprises using a web-browser plug-in to automate retrieval of the machine identity of the specific user device;

identifying a portion of the user account data correlated with the one of the one or more entity user devices by pseudo-randomly selecting a non-sensitive data point from a user account correlated with the machine identity;

combine one or more data points, including the non-sensitive data point, from the user account data to generate a unique display character string; and automatically displaying the unique display character string via a graphical user interface of the specific user device by refreshing a web page to display the unique display character string.

12. The computer-implemented method of claim 11, wherein the user account data for the one or more users further comprises a username, name, email address, personal identification number, or one or more interests of the user.

13. The computer-implemented method of claim 11, wherein the machine identity further comprises a MAC address or other physical device identifier.

14. The computer-implemented method of claim 11, wherein the one or more entity user devices are further assigned to the one or more users on a one-to-one basis.

15. The computer-implemented method of claim 11, wherein identifying the portion of the user account data further comprises randomly selecting a non-sensitive data point from a user account correlated with the machine identity.

* * * * *